(12) United States Patent
Bur et al.

(10) Patent No.: US 12,099,561 B1
(45) Date of Patent: Sep. 24, 2024

(54) SYSTEMS AND METHODS FOR PRESENTING INFORMATION WITHIN A SOFTWARE APPLICATION OR WEBSITE

(71) Applicant: Braze, Inc., New York, NY (US)

(72) Inventors: Louis Bur, Brooklyn, NY (US); Nicholas Crowley, San Juan Capistrano, CA (US); Carlo Giulietti, Miami, FL (US); Christopher Haines, Brooklyn, NY (US); Bryan Logan, Plano, TX (US); Vismaya Panchasheelan, Bellevue, WA (US); Chris Rued, Setauket, NY (US)

(73) Assignee: Braze, Inc., New York, NY (US)

( * ) Notice: Subject to any disclaimer, the term of this patent is extended or adjusted under 35 U.S.C. 154(b) by 0 days.

(21) Appl. No.: 18/375,658

(22) Filed: Oct. 2, 2023

(51) Int. Cl.
*G06F 16/9535* (2019.01)

(52) U.S. Cl.
CPC ............... *G06F 16/9535* (2019.01)

(58) Field of Classification Search
None
See application file for complete search history.

(56) References Cited

U.S. PATENT DOCUMENTS

| | | | | |
|---|---|---|---|---|
| 11,157,498 | B1* | 10/2021 | James | G06F 9/542 |
| 2013/0110792 | A1* | 5/2013 | Hudis | G06F 16/22 |
| | | | | 707/802 |
| 2013/0159402 | A1* | 6/2013 | Liensberger | G06Q 10/00 |
| | | | | 709/204 |
| 2013/0268357 | A1* | 10/2013 | Heath | G06Q 10/10 |
| | | | | 726/26 |
| 2017/0109014 | A1* | 4/2017 | Gindi | G06F 3/04842 |
| 2020/0143102 | A1* | 5/2020 | Ziraknejad | G06F 16/904 |
| 2021/0209109 | A1* | 7/2021 | Zhang | G06F 40/284 |

* cited by examiner

*Primary Examiner* — Christopher J Raab
(74) *Attorney, Agent, or Firm* — FisherBroyles, LLP

(57) ABSTRACT

Systems and methods for presenting information, messages, sound recordings and video to a user via content cards embedded in a software application includes generating content card data sets at the time that the software application is started and run. The software application requests content card data sets upon startup, and a data service then generates content card data sets at that time. The software application uses the newly created content card data sets to display information, messages, images, sound recordings and video to a user within the embedded contact cards.

24 Claims, 8 Drawing Sheets

SYSTEMS AND METHODS FOR PRESENTING INFORMATION WITHIN A SOFTWARE APPLICATION OR WEBSITE

BACKGROUND OF THE INVENTION

The invention is related to systems and methods for enhancing customer engagement. In part, this is accomplished by displaying messages or information to a user on the user's computing device. The messages or information could be presented within a company's software application that is running on a user's computing device. Alternatively, the messages or information could be presented to the user as part of a company's website that is being presented to the user by a web browser on the user's computing device.

Companies often hire a customer engagement service to help manage the delivery of information and messages to their customers. The customer engagement service can help control the flow and timing of information and messages sent to a company's customers to provide the customers with an enjoyable and informative experience. For example, some customers that are highly engaged with a company may wish to receive information or messages from the company on a frequent basis. Conversely, customers that are not highly engaged with the company may find frequent messages from the company undesirable. The customer engagement service can help determine what individual customers desire, and then manage the flow of information and messaging to customers based on their individual desires.

The customer engagement service can also cause information and messages to be delivered to customers at opportune times when the information or messaging may have the most influence over customer behavior. Similarly, the customer engagement service may know when certain types of information or messages will have the greatest value to customers, and then seek to deliver those types of information or messages at those times.

The present application describes systems and methods that present information and messages to users via "content cards." Essentially, a "content card" is a presentation area or a user interface that is embedded within a user interface of a company's software application or that is embedded in a company's website. A content card is designed to present information, messages, images, sound recordings and/or video to users according to a predefined format. However, the actual material presented to a user via a particular content card is not static. Instead, the material presented to user via a content card can change over time based on a variety of factors. The factors that could trigger a change in the material being presented to a user via a particular content card include the passage of time, actions taken by users, and actions or events caused by third parties. Characteristics of the user of the software application or website could also play a role in both the content that is displayed in a particular content card, and when the content is changed.

The content card is essentially a template that can be completed or "filled in" using information provided in a "data set" for the content card. Content card data sets are typically stored by a data service. When a software application is first started and run, the software application sends a request to the data service for content card data sets for embedded content cards. The data service sends back data sets for some or all of the embedded content cards. The software application then uses the information in the received data sets to present information, messages, images, sound recordings and/or video via the embedded content cards.

As mentioned above, content cards also can be embedded in a page of a company's website. In that instance, when a web browser navigates to the relevant page of the company's website the web browser requests data sets from the data service for some or all of the embedded content cards. The data service sends requested data sets to the web browser, and the web browser uses information in the data sets to present information, messages, images, sound recordings and possibly videos in the embedded content cards.

The messages or information presented to a user within a content card can be customized for a particular user. For example, if a content card is embedded within a company software application, there could be a different data set for populating the content card with information and messaging for each individual user of the software application. When a first user runs the company's software application on a first computing device, the software application on the first computing device consults a data service to obtain a data set for the content card. The data set sent from the data service to the software application may include information that is specific to the user or that is customized in some fashion for the first user. That data set is then used to present personalized or customized messages or information to the first user within the embedded content card. The personalization or customization could include using the name of the first user in messages, presenting information that is relevant to the first user's location, presenting information or advertisements that are tailored to the first user's interests, as well as a variety of other factors.

When a second user runs the company's software application on a second computing device, the software application on the second computing device consults the data service and obtain a data set for completing the same content card in the company's software application. The data service sends a data set back to the second computing device that includes information specific to the second user. The data set that is specific to the second user is then used to generate information or messages that are displayed to the second user within the content card embedded in the company's software application.

In this way, different users are presented with different personalized or customized messages or information within the same content card location in the company's software application. This same concept can be applied to embed a content card in a company's website, and to then present personalized or customized messages or information to individual users at a particular location of the company's website corresponding to the content card.

A company can specify that the messages and information presented to users via an embedded content card are to be changed over time. For example, a company could specify that at midnight of each day, a new data set is to be obtained for a certain content card that is embedded in the company's software application. Each time a new data set is obtained for the embedded content card, the information in the new data set is used to generate new messages and information presented in the embedded content card.

One example would be a content card embedded in a company's website that is configured to present current weather information. In this instance, the company could specify that at the end of each hour the software application should seek out a new data set for the content card that has updated weather information. Each time a new data set for the content card is obtained, the software application updates the weather information being displayed in the content card based on information in the newly obtained data set.

A company can also configure a content card to present information or data based on triggers. A trigger could be the passage of a certain period of time. In addition, a trigger could be based upon an action that has been taken by a user or a third party. Alternatively, or in addition, a trigger could be based on the occurrence of a particular event. In some instances, a content card could be configured to not present any information or message to a user until a triggering event has occurred. Once the triggering event occurs, the software application requests a data set for the content card and then use the returned data set to present information or messages to the user via the content card. Here again, the process of displaying messages and information to user within the content card could involve the software application requesting a data set for the content card from a data service, and then used the obtained data set to present information and messages to the user via the content card.

For example, if a content card is designed to present an advertisement for the purchase of a specific item, the content card can be configured to change what is presented in the content card depending upon user actions. If the content card initially displays an advertisement for a first consumer good, and the user then actually purchases the advertised consumer good, it makes sense to no longer advertise for the consumer good within the content card. The user's action in purchasing the consumer good could trigger the software application within which the content card is embedded to request a new data set for the content card from a data service. Information in a new data set could then be used to display a new advertisement for a second consumer good in the content card.

Actions of third parties or events which have occurred that have nothing to do with the user or the company also can act as triggers for replacing the current message or information presented in a content card with new information. Virtually any type of trigger could be designed into a content card to cause the current information or messages presented within a content card to be replaced with new messages or information.

When a trigger is used to cause the replacement of data within a content card, the data service may be responsible for monitoring whether and when the trigger condition(s) is satisfied. However, one or more actions taken by the user may be reported from the software application to the data service. The data service can then take those reported user actions into account in determining whether a trigger has been satisfied such that it is time to replace the information in a content card.

Existing systems and methods which enable the use of content cards as described above are designed to generate the data sets which are used to generate the information and messages that appear within a content card well in advance of the time at which the content card is to be displayed within a company software application or on company website.

Also, as mentioned above, the information presented in a content card may be customized in some way for an individual user. If so, a separate data set must be generated for each individual user for each content card. If there are 100,000 users of a particular software application, and there is only one content card in the software application, this still means generating 100,000 data sets for the content card, one for each user. As a result, a data service typically generates large numbers of data sets as part of batch processes. Those data sets are stored and later made available to the software applications within which content cards are embedded or to web browsers that are displaying a website with embedded content cards.

As a real life example, assume that a company provides its users with a software application and the software application includes three embedded content cards. Each of the three content cards is configured present users with different types of messages or information that are personalized or customized for the user. A first content card could provide the user with the current weather forecast for the user's home location. A second content card could present the user with an informational message that is addressed specifically to the user by their first name. A third content card could be configured to advertise a consumer good based on the user's known interests.

Under these circumstances, existing content card systems would generate a large number of individual data sets for the first content card, one data set for each of the individual users of the software application. Each individual content card would include information about the weather forecast for a single user's home location, or information that makes it possible for the software application to obtain the weather forecast for the user's home location.

Existing content card systems also would generate a large number of different data sets for the second content card, one for each user of the software application. Each data set would include either a fully formatted message addressed to an individual user by name, or information that makes it possible for the software application to generate a message addressed to the user by name.

Existing content card systems also would generate a large number of data sets for the third content card embedded in the software application, one for each user. Each individual data set would include information advertising a consumer product that is likely to be of interest to an individual user. The content card system could generate those data sets for individual users based on information available to the content card system regarding the interests and preferences of the users.

The content card system would generate all of the data sets discussed above in batch processes and then store the data sets for later use. This requires significant processing resources because an individual data set must be generated for each individual user for each of the three content cards. Those data sets must then be stored in readily available databases, which requires considerable amounts of memory. If there were 10,000,000 users of a popular company's software application, this would require generating and storing 10,000,000 data sets for each of the three content cards, resulting in the generation and storage of 30,000,000 data sets. This can require hours and hours of processing time on even the fastest computers, and the generated data sets will consume large amounts of data storage capacity.

When a particular user starts and runs the software application, the software application sends a message to a data service requesting data sets for any embedded content cards. In many instances, the data service will be aware of which content cards are embedded in the software application making the request for data sets. In the example discussed above, the data service would know to provide data sets for the three content cards embedded in the software application.

The request sent from the software application to the data service will include some information that is indicative of the identity of the user. The data service then locates the three previously generated data sets for the three content cards that were customized for that user and sends the three customized data sets back to the software application. The software application then uses information in the three data sets to provide customized or personalized information and messages to the user, as explained above.

Unfortunately, in many instances the vast majority of the data sets that are created for individual users for content cards embedded in a company's software application or website are never actually used. It is quite common for only a small percentage of the total number of users of a software application to actually open and use the software application on a regular basis. Using the example provided above, it would be common for only 200,000 of the 10,000,000 users of the company software application to actually open and run the software application on a regular basis. This means that only 600,000 of the 30,000,000 data sets would actually be used to generate and display information and messages in the three content cards embedded in the software application. The other 29,400,000 data sets are never used. This means a large amount of processing time was wasted and considerable amounts of data storage is being devoted to storing data sets that are never actually used.

DETAILED DESCRIPTION OF PREFERRED EMBODIMENTS

Figure 1:
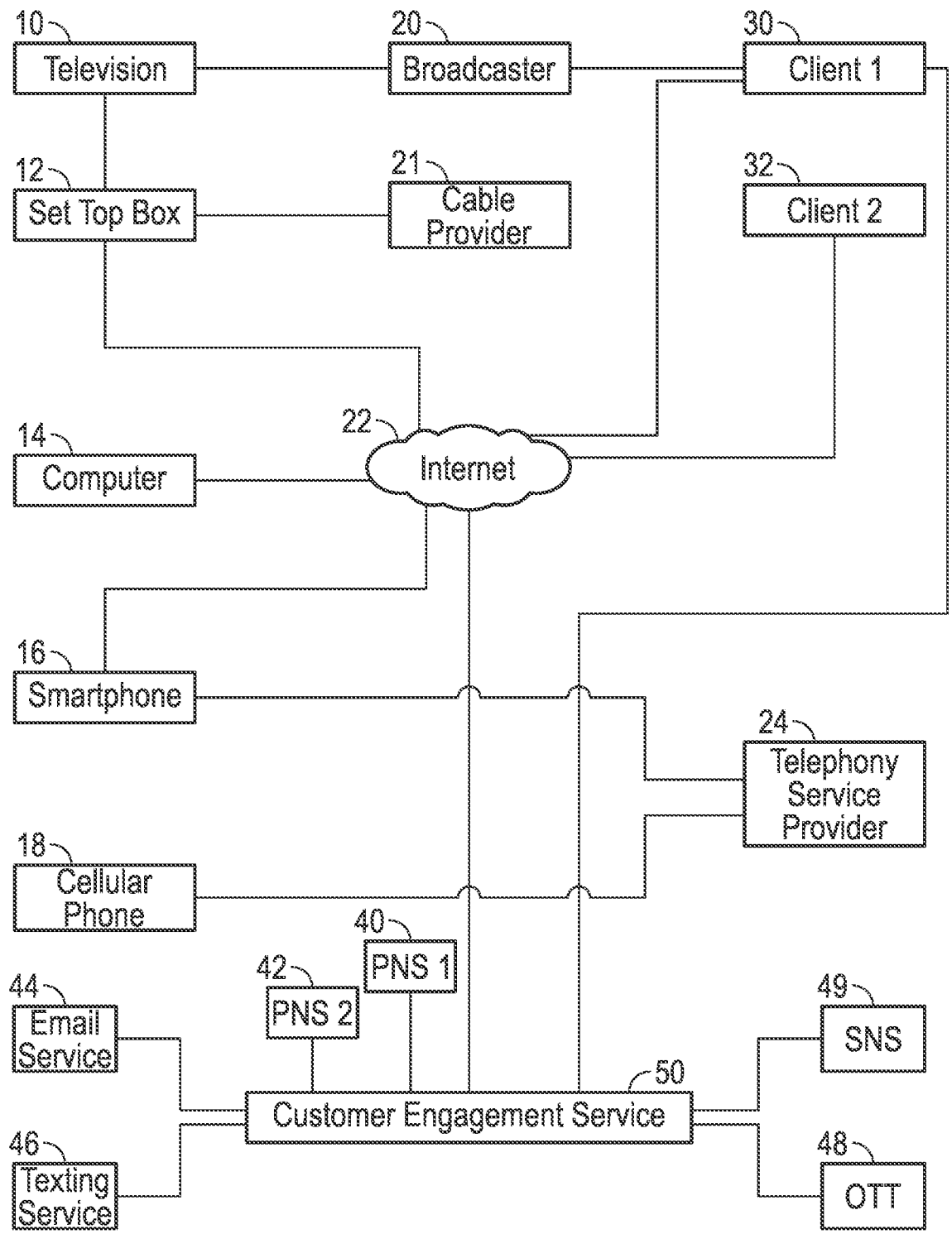
FIG. 1 is a diagram of a communications environment which could be utilized by systems and methods embodying the invention.

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. As mentioned above, a customer engagement service helps a company interact with its users to enhance the customer experience and to increase the company's business, revenue and/or stature. One of the ways that a customer engagement service assists a company is by helping the company to manage how and when messages are delivered to the company's customers.

The following description refers to "clients" or "companies" and to "users". For purposes of this discussion, a "client" or a "company" would be a client of the customer engagement service. In other words, a client or a company is a business that is being assisted by the customer engagement service. "Users" are a client's or company's users, not users of the customer engagement service. The customer engagement service sits between a client or company and the client's or company's users to manage and orchestrate the delivery of messages sent from the client/company to its users.

A "message" could take many different forms and be delivered to a user in many different ways. For example, a "message" could be a mobile or browser-based push notification sent to users by a push notification service.

A message could also be an in-app message that is delivered to a user via a client's software application. The client's software application could be resident on a user's computer, a user's smartphone or any other device with a processor that is capable of running such a software application. The in-app messages generated and/or delivered by such a software application could be received by the user in various ways.

A message could also be presented to a user via a content card that is embedded within a company's software application or that is embedded within a company's website. If a content card is embedded in a company's software application, the software application itself would obtain content card data sets from a data service for the content cards that are embedded in the software application. The data service may or may not be part of a customer engagement service. The software application would then use the information in obtained data sets to present information, messages, images, sound recordings and possibly video to the user via the content card embedded in the company's software application.

In the case of content cards that are embedded in a company's website, a web browser software application would be responsible for presenting the website to the user. When a user navigates to a website that includes one or more embedded content cards, the web browser requests data sets for the embedded content cards from a data service. The web browser then uses information in the obtained data sets to present information, messages, images, sound recordings and possibly video to the user via the embedded content card.

For purposes of the following description and for purposes of the appended claims, a "software application" with embedded content cards will refer to both a traditional software application having embedded content cards, as well as a web browser that is presenting a page of a website that includes embedded content cards. Thus, references to a software application with embedded content cards will encompass a web browser presenting a page of a website with embedded content cards.

Messages could also be presented to a user while the user is using an augmented reality software application. In this instance, the customer engagement service and/or a client company could designate a plurality of message placement locations. The message placement locations would be real geographical locations. When a user operating an augmented reality software application aims a camera of his computing device such that one of the designated message placement locations is within the image being generated by the camera, a message could be displayed at the message placement location. The message displayed at the message placement location could be a static image, an animated image, or a video.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future.

Messages can be presented to users, via content cards or otherwise, under multiple different circumstances. Two of the most common relate to "campaigns" and "journeys".

In a messaging campaign, the client company or the customer engagement service define a "campaign" to present a user with multiple messages. There may be triggers that must be satisfied for each message to be presented to the user. One of the triggers could be that the user has already seen a previous message in the campaign. Another type of trigger could be related to the passage of time. For example, a messaging campaign could be designed to present the user with a different message each day of the week. Any other sort of trigger based on other things, like the actions of a user or the actions of third parties could also control how and when messages are to be presented to users.

A messaging campaign could also specify how certain messages are to be presented to a user. For example, a messaging campaign could specify that a user is to receive a first message as an in-application message that is presented to the user while the user is engaged with a client's software application. The campaign could further specify that the user is to receive a second message as a text message, and that the user is to receive a third message via email. Thus, a campaign could specify not only what messages are to be presented to a user, but also how those messages are to be presented to the user.

The way in which a messaging campaign is designed is extremely flexible so that selected messages can be presented to users based on any number and type of parameters. This allows each client company to design a messaging campaign in a way that is relevant to the company and to its users.

The following description refers to "campaign rules" or "campaign parameters". Campaign rules or campaign parameters are the parameters that have been selected to control the delivery of messages for a particular messaging campaign. Thus, the campaign rules/parameters can specify what messages are to be presented to the user, and the conditions that must be satisfied, if any, for individual messages to be presented. The campaign rules/parameters can further specify how the messages are to be delivered to the user, meaning the medium through which a message is to be delivered.

Another way to control the way that messages are delivered to a user is via a "journey". A journey shares some characteristics with a messaging campaign, in that a "journey" also allows a client company or a customer engagement service to control how messages are delivered to a user. However, a journey is typically more restrictive in nature.

In a "journey", messages are presented to a user in a specific, defined sequence. Often a journey will be defined by "steps", and the steps of a journey must be completed in sequence. Thus, a message that a user is to see in step 4 will not be shown to the user until the user completes step 3.

A particular journey could have branches such that at one step of the journey, the user could take a first action to be sent down a first branch that includes a first set of steps or take a second action to be sent down a second branch that includes a second set of steps. Regardless of whether a particular journey includes one or multiple branches, a key characteristic of a journey is that a user must complete the steps in order.

Because steps of a journey must be completed in a particular order, it is necessary to track what steps a user has completed, and often the actions that the user has taken along the way, or the messages that a user has seen along the way. Information about how a user has progressed through a journey is stored in a journey metadata database. When it is time to determine what messages to present to a user as part of a journey, the system consults the journey metadata to determine where in the journey the user is currently located. Then, based on that information and the rules/parameters that have been established for the journey, the system can determine what new message or messages are to be presented to the user.

In the case of both messaging campaigns and journeys, the messages that are to be presented to the user can be presented via a content card that is embedded in a company's software application or website. Thus, when it is time to determine what information to insert into an embedded content card, it is often necessary to refer to messaging campaign rules/parameters or journey rules/parameters. And in the case of a journey, it would typically be necessary to also consult the journey metadata that has been stored for a user to determine where in the journey the user is presently located.

FIG. 1 illustrates a communications environment in which systems and methods embodying the invention could be practiced. As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application provided by client one 30 and that is resident on the user's computer 14 might also be used to access media content provided by client one 30 via the Internet 22.

Yet another user may have a smartphone 16 that is capable of communicating over the Internet 22 and/or via a telephony service provider 24. A software application provided by client one 30 and that is resident on the user's smartphone 16 could be used to access media content provided by client one 30 via the Internet 22 or via the telephony service provider 24.

The computer 14 and smartphone 16 may be capable of running an augmented reality software application. In that instance, a message could be displayed to a user if the user, operating the augmented reality software application, points a camera of the computer 14 or smartphone 16 such that a designated message placement location is within the image being generated by the camera. The message would be displayed at the designated message placement location.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users could be a client in this environment.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access a client's services and to receive messages from a client. Thus, the depiction in FIG. 1 should in no way be considered limiting.

Figure 2:
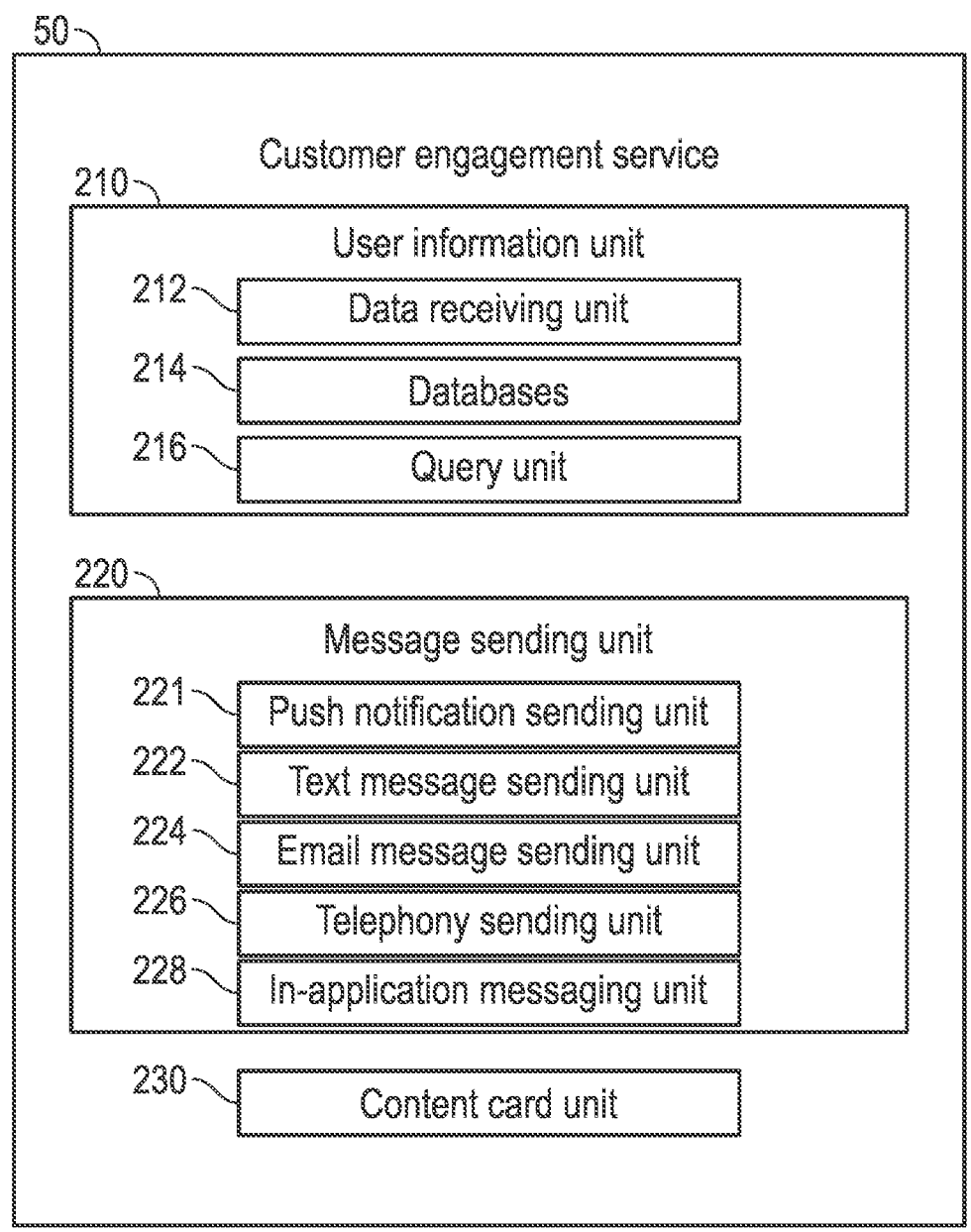
FIG. 2 is a diagram of selected elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically a client would provide information about its users to the data receiving unit 212 via various means.

For example, in some instances a client may send notifications to the data receiving unit 212 each time that one of the client's users engages with the client in some fashion. For example, if the client is an online retailer, each time that a user makes a purchase from the online retailer, the online retailer could send the data about the purchase made by that user to the data receiving unit 212. As will be explained below, information received by the data receiving unit 212 may satisfy a trigger for causing an in-application message to be presented to a user.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

The databases 214 could include one or more journey metadata databases that includes information about how individual users have progressed though defined "journeys", as discussed above. Thus, when it is necessary to determine what information to insert into a content card that is embedded in a company software application or website, the system may consult the journey metadata database to acquire information about a user's present position in a journey, to thereby determine what message or messages should now be presented to the user via a content card according to the journey rules/parameters.

Because clients and software applications that the clients provide to their users all report user activity to the customer engagement service 50, the customer engagement service 50 is able to build a detailed picture of each user, the user's preferences, and the user's typical courses of action.

In addition, because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding a user's contact with the client, the customer engagement service 50 may learn that shortly after an individual user received a message from the client, the user logged into the client's website, or that shortly after the user received a message, the user opened a software application provided by the client. For all of these reasons, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various items of information about the users.

The customer engagement service 50 also includes a message sending unit 220. The message sending unit 220 is responsible for sending messages to a client's users. As explained above, messages could take many different forms and have many different delivery channels. The message sending unit 220 includes a push notification sending unit 221 that causes mobile or browser-based push notifications to be sent to users via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a message to the users.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

The message sending unit 220 further includes an in-application messaging unit 228. The in-application messaging unit 228 is responsible for causing messages to be delivered to a user via a client's software application that it provides to its users. For this reason, the in-application messaging unit 228 can interact with an instantiation of a client's software application that is resident on a user's computing device.

The customer engagement service 50 also includes a content card unit 30. Details of the content card 230 are discussed below in connection with FIG. 3.

Figure 3:
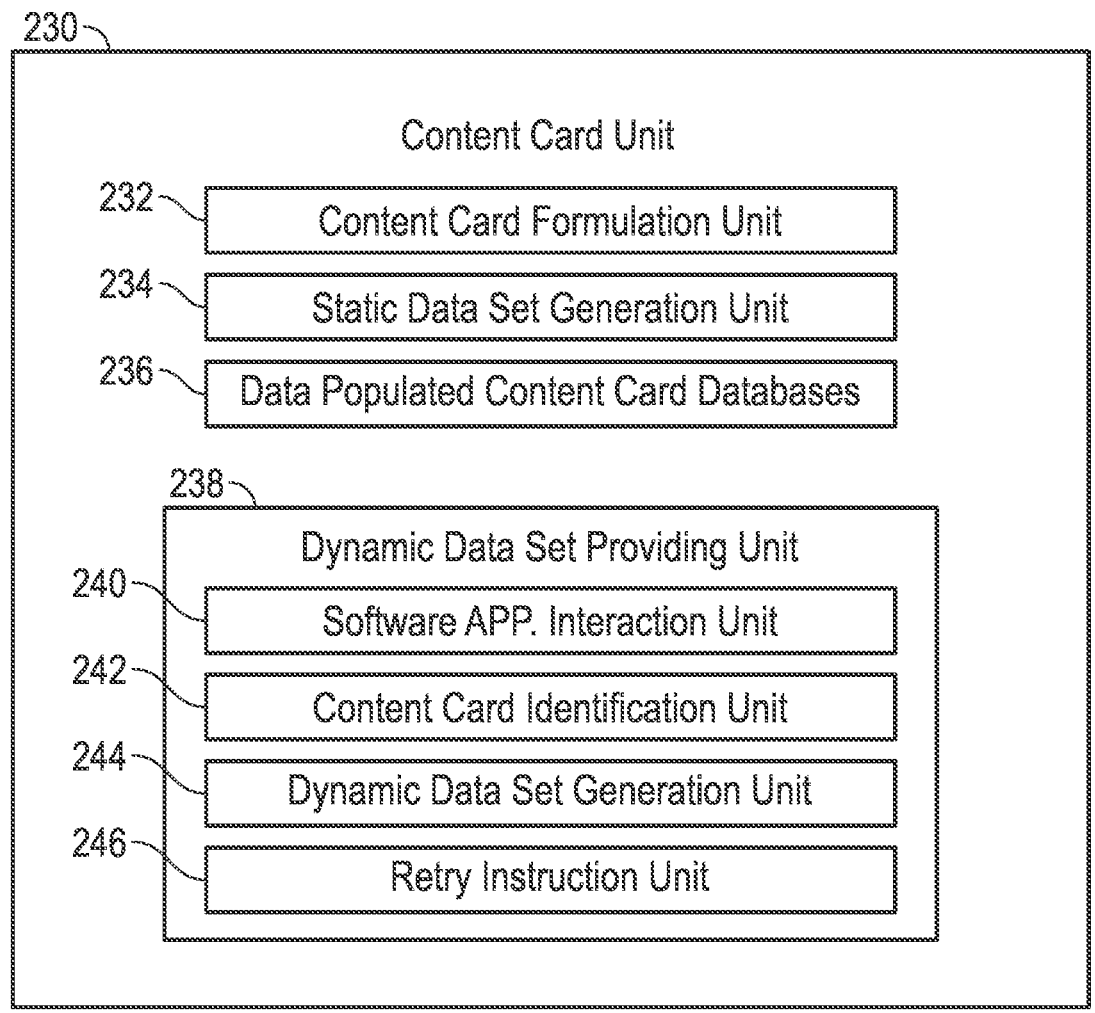
FIG. 3 is a diagram illustrating selected elements of a content card unit.

FIG. 3 depicts selected elements of the content card unit 230. As illustrated in FIG. 3, the content card unit 230 includes a content card formulation unit 232. An individual responsible for configuring a content card which is embedded within a company's website or software application could include marketing individuals within the company itself, as well as consultants outside the company which work for a customer engagement service. In any event, a person would use the content card formulation unit 232 to configure a content card which will then be embedded within a company's software application or website.

The format of the content card can indicate how messages and information are to be displayed within the content card. This can include text messages, images as well as video. In some instances, a sound recording could be made available to a user via a content card. The format of the content card will indicate how information and data pulled from a content card data set is to be used to generate the information and messages presented within the content card.

The content card formulation unit 232 also allows a creator to specify the conditions under which information or messages presented within a content card are to be changed or updated. As mentioned above in the Background section, this could include a time-based trigger which results in the information and messages displayed within a content card being changed on a periodic basis as time passes. Alternatively, a variety of other triggers could result in the information displayed in a content card being changed or updated. Triggers could be based on actions taken by the user as well as actions taken by third parties. Further, triggers could be based on events or other occurrences.

In some embodiments, the data service that provides data sets for completing content cards will track the trigger conditions associated with a particular content card. If the trigger conditions for changing the information presented in a content are satisfied, this essentially means that the next time the software application that includes the content card requests a data set for the content card, the data service will provide a new data set with new data. In this scenario, the software application need not track trigger conditions or make any sort of determination as to when information in a content card needs to be updated. The software application simply requests new data sets for all embedded content cards when the software application is started. The data service then provides a new data set for a particular content card once the trigger conditions for changing the information in the content card are satisfied.

In alternate embodiments, when the trigger conditions for changing the information in a content card have been satisfied, the data service may automatically send new data sets for the content card to any software applications that include the content card and that are currently running on user computing devices. Alternatively, the data service may send a message to the software applications that are currently running on user computer devices, instructing the software applications to request new or updated data sets. Each running software application would respond by making a new request for data sets for its embedded content cards, and the data service would then provide new or updated data sets for one or more of the embedded content cards. Operating in this fashion would likely result in the new data being presented in the content card more rapidly than would occur if the data service simply waits for software applications to make a request for data sets upon startup.

In still other embodiments, the software application running on a user computing device may track the trigger conditions associated with each embedded content card and determine when the trigger condition(s) for changing the information in a content card have been satisfied. When such trigger condition(s) for a content card are determined to be satisfied, the software application would request a new data set for that content card from the data service. The data service will then provide a new data set for the content card, and the software application would use the new data set to present new or updated information in the content card. This sort of an embodiment presumes that the data service also knows to provide a new data set for the content card.

The content card unit 230 also includes a static data set generation unit 234. The static data set generation unit 234 generates large numbers of data sets for each content card in advance of when the data sets will be required and stores those data sets in data populated content card databases 236. This corresponds to the process described above in the Background section. Thus, for example, the static data set generation unit 234 could generate, for one content card embedded in a company's software application, a plurality of data sets, one for each user of the software application. Each individual data set would include information that makes it possible to personalize or customize the information presented to the users in the content card.

The same basic concept could apply if the information and messages presented within a content card are to be changed according to a particular time-based trigger. The static data set generation unit 234 would generate a plurality of different data sets for a content card, each data set corresponding to a different time period. Those data sets would be stored in the data populated content card databases 236. When the time arrives to replace or update information presented in a content card, one of the mechanisms described above ultimately would result in a new data set for content card being sent to the software application, and the software application would use the new data set to display new or updated messages or information in the content card.

The content card unit 230 also includes a dynamic data set providing unit 238. The dynamic data set providing unit 238 is configured to generate and provide data sets used to present messages and information within content cards embedded within a company's software application or website just like the static data set generation unit 234 does. However, the dynamic data set providing unit 238 does not generate and store large numbers of data sets for all users in advance of when those data sets are needed. Instead, the dynamic data set providing unit 238 generates data sets for content cards only after a software application or a web browser software application makes a request for a data set. As explained above, this typically only occurs when a user has opened or run a company software application, or navigated to a particular page of a company's website that includes one or more embedded content cards. In other words, the dynamic data set providing unit 238 generates and provides content card data sets on demand, and only as needed.

The dynamic data set providing unit 238 includes a software application interaction unit 240 which is responsible for communicating with a company's software application or a web browser displaying a company's website. As will be explained in greater detail below, the software application interaction unit 240 receives requests for contact card data sets from a company's software application or from a web browser displaying a company's website when a user first opens or runs the software application or navigates to the company's website. The software application interaction unit 240 is also responsible for communicating dynamically generated data sets back to the company software application or the web browser displaying a company's website.

The dynamic data set providing unit 238 further includes a content card identification unit 242, which is responsible for determining which content card data sets should be generated in response to a data set request from an instantiation of a company's software application or from a web browser software application displaying a company's website. In many instances a data set request received from a company's software application or from a web browser displaying a company website will not identify the content cards for which data sets are needed. However, the content card identification unit 242 is capable of making that determination based on stored information regarding the content of various company software applications and company website. In some instances, the data set request received from a company software application or a web browser displaying a company website will include a list of those content cards for which data sets are needed.

In most cases, the content card identification unit 242 will need to know something about the user in order to determine what content card data sets to generate in response to a data set request. The data set request may include identity information that can be used to identify the user of the software application that made the data set request. Thus, the first step may be to determine the identity of the user based on the identity information included in the data set request. Having identified the user, the content card identification unit 242 could then go about determining which contact card data sets to generate and send back to the software application in response to the data set request.

In other instances, the identity information included in the data set request may be sufficient to determine characteristics of the user of the software application that sent the data set request. That information alone may be sufficient for the content card identification unit 242 to identify the content card data sets to generate and send back to the software application. For example, knowing one or more of the user's characteristics could allow the user to be categorized in a particular segment of users, and the segment would then determine what content card data sets to generate and send back to the software application.

In other instances, the content card identification unit 242 may consult with messaging campaign rules/parameters to determine what content card data sets should be sent back to the requesting software application. Here again, the identity of the user or knowledge about the user's characteristics may be required, in conjunction with the messaging campaign rules/parameters to determine what content card data sets to generate and send back to the software application.

In still other instances, it may be necessary for the content card identification unit 242 to consult with message journey rules/parameters to determine what content card data sets to generate and send to the requesting software application. In the case of a message journey, it will be necessary to know the identity of the user. Also, the content card identification unit 242 will need to obtain metadata from a journey metadata database that indicates where the particular user is in a certain journey in order to determine which content card data sets to generate and send back to the requesting software application.

In still other instances, it may be necessary for the content card identification unit 242 to check the data populated content card databases 236 to determine what content card data the user may have already seen, or what campaigns the user has already received. This information could also be used to determine which content card data sets to generate and send back to the requesting software application.

The dynamic data set providing unit 238 also includes a dynamic data set generation unit 244 which is responsible for generating data sets for content cards upon demand. Typically, the dynamic data set generation unit 244 will use the data available to it at the time of a request for content card data sets to actually generate the data sets. This ensures that the data sets have the most up-to-date information possible. In contrast, when data sets are generated by the static data set generation unit 234 and those data sets are stored in the data populated content card databases 236, the data sets can be based upon information that has become stale or outdated by the time a request for the data set is received. Data sets that are dynamically generated by the dynamic data set generation unit 244 are then provided back to the requesting instantiation of the company software application or the web browser that made the data set request via the software application interaction unit 240.

In many instances, when the dynamic data set generation unit 242 received a data set request from an instantiation of a company software application or from a web browser, it will be possible for the dynamic data set generation unit 244 to immediately generate all of the requested data sets utilizing readily available data. As a result, it is often possible to immediately generate and send all necessary content card data sets back to the requesting software application or web browser.

However, in other instances it may be necessary for the dynamic data set generation unit to consult with third party data providers in order to generate a data set for a particular content card. As a result it will sometimes be the case that the dynamic data set generation unit 244 cannot immediately generate a data set needed to respond to a data set request received from an instantiation of the company software application or from a web browser. In those instances, a retry instruction unit 246 would send a data set request retry instruction to the requesting instantiation of the company's software application or the web browser. The data set request retry instruction asks the software application or web browser to send a renewed request for data sets at some time in the future. The time at which the software application or web browser is to send a renewed request for data sets could be specified in the data set request retry instruction message sent to the software application or web browser. In that instance, the specified time could be a specific date and time, or an indication of a delay period that must elapse before the software application or web browser sends a renewed request for data sets.

While a delay period is expiring, the dynamic data set generation unit 244 would go about the process of obtaining any information required from third parties that is needed to generate a data set for a particular content card embedded in the company's software application or website. The hope is that the dynamic data set generation unit 244 is able to generate any additional content card data sets that could not be immediately generated when the data set request is first received before the delay period expires. When the dynamic data set providing unit 238 receives a renewed data set request at the end of that delay period, any additional data sets that were generated while the delay period expired are provided to the software application or web browser.

Figure 4:
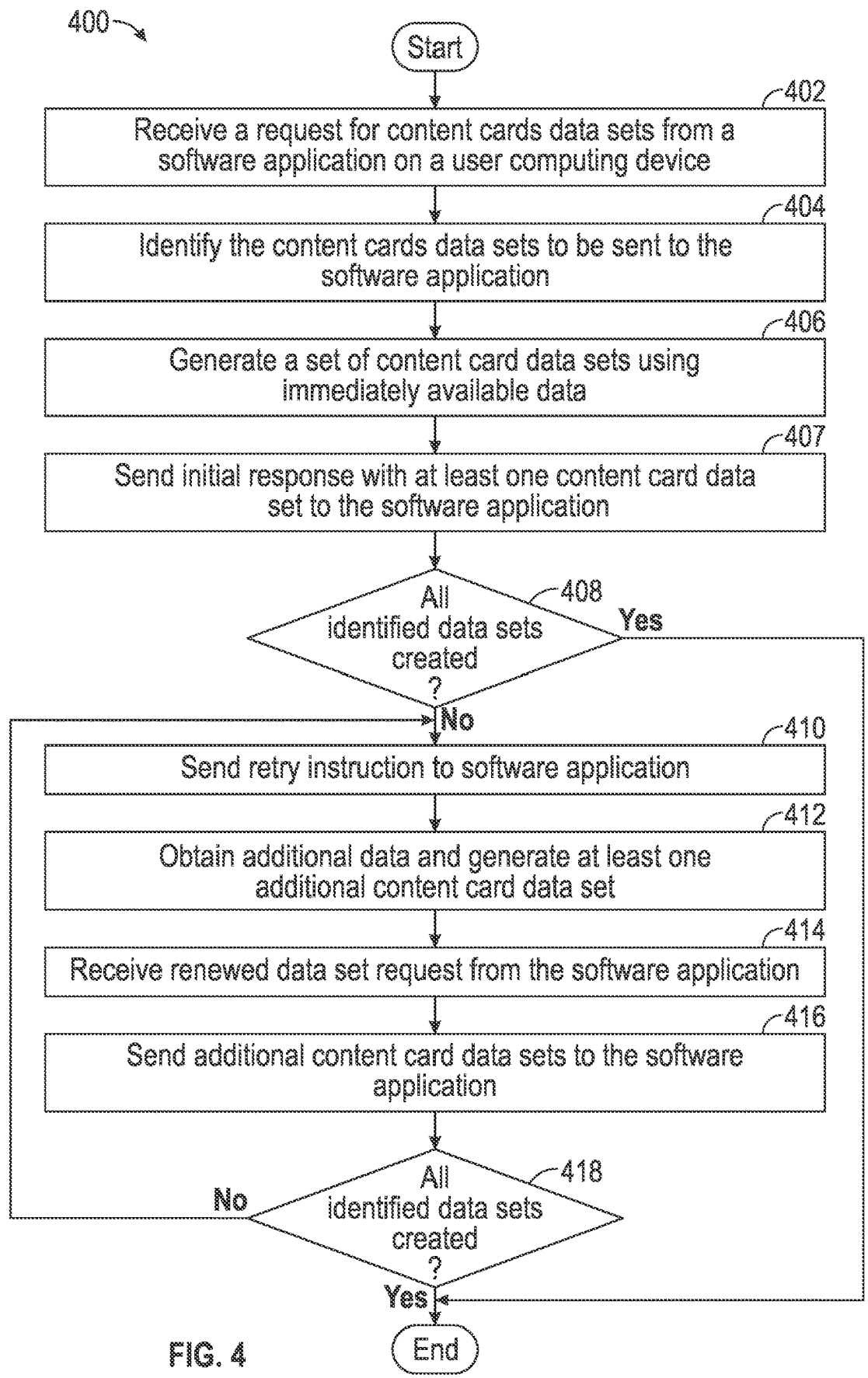
FIG. 4 is a flowchart illustrating steps of a method of generating content card data sets that would be performed by elements of a content card unit.

FIG. 4 illustrates the steps of a method that would be performed by elements of the dynamic data set providing unit 238 of a content card unit 230 in order to generate content card data sets and to provide those content card data sets to a company's software application or to a web browser displaying a company's website. The method starts and proceeds to step 402 where the software application interaction unit 240 receives a request for content card data sets from an instantiation of the company software application having embedded content cards and which has just been opened or run by a particular user, or from web browser that has just navigated to a page of the company's website having embedded content cards. The request that is received by the software application interaction unit 240 could include information which allows the dynamic data set providing unit 238 to identify the individual user that is running the software application or operating the web browser that sent the data set request.

In some instances, the request received from the software application or web browser would simply make a request for data sets for content cards. In that instance, in step 404 a content card identification unit 242 would determine which content cards data sets should be provided back to the requesting software application. This could include determining which content cards are present in the software application making such a request. If the data set request came from a web browser, the content card identification unit 242 could determine which content cards are present in the webpage being displayed by the web browser. This can be accomplished by consulting databases of information about company software applications and company websites. In other instances, the request received in step 402 may include an identification of which content cards are present in the software application or website, and thus which data sets are required.

As will be described in greater detail below, step 404 may require the content card identification unit 242 to determine the identity of or characteristics of the user and consult messaging campaign rules/parameters. Further, in some instances, step 404 may require the content card identification unit 242 to determine the identity of the user, then review the user's journey metadata stored in a journey metadata database to determine where the user is with respect to one or more journeys. Then, based on where the user is with respect to the one or more journeys, the content card identification unit 242 may need to consult with journey rules/parameters to determine which content card data sets to generate and send back to the requesting software application.

In some instances, it may not be necessary to provide data sets for all of the content cards that are embedded within the company's software application or website. Thus, step 404 may involve identifying only those content cards for which new data sets are to be provided back to the requesting software application or web browser.

For example, a content card configuration could specify that messages or information are only to be displayed within the content card during certain time periods. If the current time is not within a display time period, it would not be necessary to provide a data set for that content card.

Likewise, a particular content card might specify that the content card is only to display messages or information if the user running the software application or viewing the website has certain characteristics. If the user running the software application or viewing the website does not have the characteristics specified in the content card configuration materials, there would be no need to generate and provide a data set for that content card.

In step 404, the content card identification unit 242 may examine configuration materials for each of the content cards embedded in the requesting software application or website and make a determination about whether information or messages should be presented in each of those content cards. As noted, this may require identifying the user that is running the company software application or viewing the company website and taking that individual user's characteristics into account in making the determination.

The method then proceeds to step 406 where the dynamic data set generation unit 244 goes about the process of generating data sets for each of the content cards embedded in the company's website or software application that should display information or data to this individual user. This can include obtaining personalization information according to the rules/parameters that are established for each individual content card. Alternatively, this could include obtaining information that is not specific to the user, but that is specific to the particular content card, either from an internal data source or from a third-party data source. In some instances, journey metadata for a particular user is also used to generate content card data sets based on message journey rules/parameters. The dynamic data set generation unit 244 then generates a dataset for each of the content cards embedded in the company's website or software application which are to display information or messages to this individual user, and which could be immediately generated based on readily available data.

As mentioned above, it may not be possible to immediately generate content card data sets for all of the content cards embedded software application or website which are to be presented to the user because some of the data needed to generate those data sets may not be readily available. Step 406 only covers the generation of content card data sets using immediately available data.

In step 407, the immediately generated content card data sets are then sent to the requesting software application or web browser via the software application interaction unit 240. The software application or web browser then uses the information in the data sets to generate information or messages in as many of the embedded content cards as possible or necessary.

In step 408, a check is performed to determine if content card data sets were generated for all of the content cards embedded in the software application or website which are to be presented to the user. If so, the method then ends. However, if the check performed in step 408 indicates that the dynamic data set generation unit 244 was unable to immediately generate and provide one or more required data sets, the method proceeds to step 410.

In step 410 a retry instruction unit 246 of the dynamic data set providing unit 238 sends a data set request retry instruction to the software application or website via the software application interaction unit 240. The data set request retry instruction indicates that the software application or web browser should make a renewed attempt to obtain data sets at some time in the future. In some instances, the software application or web browser may simply send a renewed request for data sets after a predetermined delay period expires. In other instances, the data set request retry instruction may specify, in some way, when a renewed data set request should be made by the software application or web browser. This could mean specifying a specific time for making a renewed request, or specifying a delay period that must expire before a renewed request is made.

The data set request retry instruction sent to the software application or web browser may set the time period that is to elapse before a renewed data set request is sent based on the type or amount of information that the dynamic data set generation unit 244 needs to acquire to complete the process of generating data sets for the software application to web browser. Thus, if only a small amount of time will likely be required to obtain all needed data, the data set request retry instruction could specify a small delay period. If a larger period of time will be required to obtain all needed data, a large delay period could be specified.

The method then proceeds to step 412 where the dynamic data set generation unit 244 continues to obtain data necessary to generate content card data sets which could not be immediately generated using readily available data. During step 412, the dynamic data set generation unit 244 generates at least one additional content card data set using information obtained after the first set of content card data sets were sent to the requesting software application or web browser in step 407.

In step 414, the dynamic data set providing unit 238 receives a renewed request for content card data sets from the software application or web browser. This request could be formatted or tagged in some fashion to indicate that it is not an initial data set request, but rather it is a renewed data set request. This allows the dynamic data set providing unit 238 to handle the request differently from an initial data set request and to avoid any attempt to generate the full set of data sets needed by the software application or web browser.

In step 416, the dynamic data set generation unit 244 causes any additional data sets that were generated in step 412 to be sent to the requesting software application or web browser via the software application interaction unit 240.

In step 418, a check is performed to determine if content card data sets were generated for all of the content cards embedded in the software application or website which are to be presented to the user. If the check performed in step 418 indicates that the dynamic data set generation unit 244 was unable, thus far, to generate and provide one or more required data sets, the method loops back to step 410 and proceeds as described above. If the check performed in step 418 indicates that all required data sets have been created and sent, the method then ends.

Figure 5:
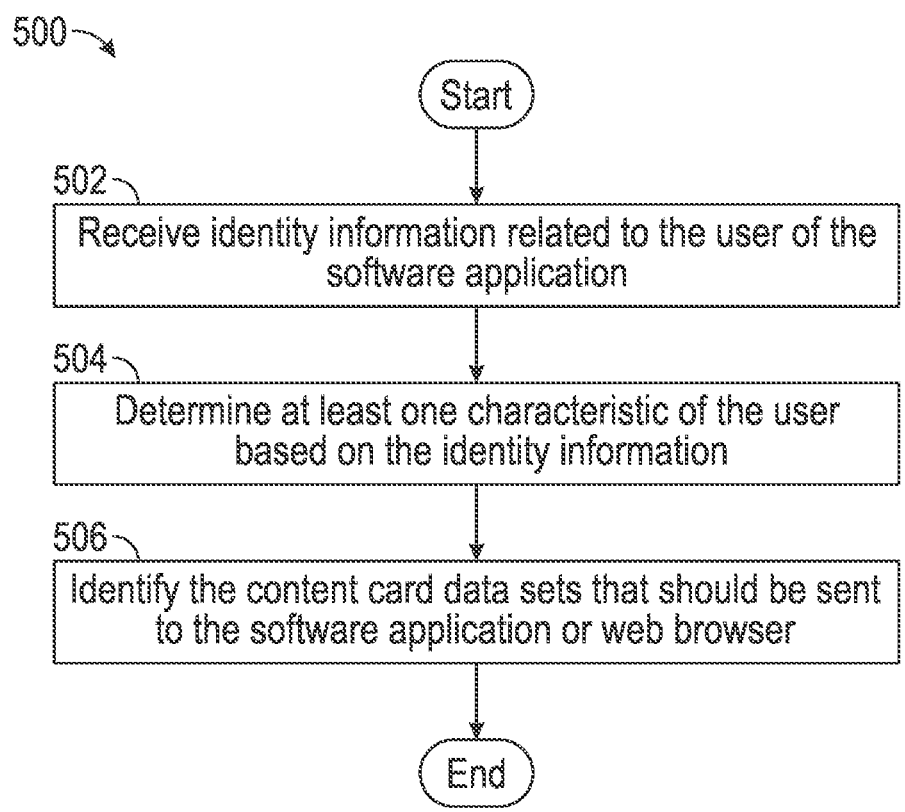
FIG. 5 is a flowchart illustrating steps of one method of identifying the content card data sets that should be generated in response to a request for content card data sets received from a software application being run by a particular user.

FIG. 5 illustrates steps of a one method that could be performed by the content card identification unit 242 to identify those content card data sets which must be generated to satisfy a content card data set request received from a particular instantiation of the company's software application or from a web browser displaying the company's website. This corresponds to step 404 of the method depicted in FIG. 4 and discussed above.

The method begins and proceeds to step 502 where the dynamic data set providing unit 238 receives, as part of a data set request, information that can be used to identify a user of the instantiation of the company's software application or the web browser displaying the company's website. In some instances, this information may be a user name or some other user identifier. In other instances, a particular instantiation of the software application may be registered to a particular user and the data set request may include information identifying the instantiation of the software application. This would make it possible to look up the identity of the user based on a registration or serial number associated with the instantiation of the company's software application. In still other instances, an identification number or code associated with the computing device running the software application or web browser may be included in the data set request, and that information could be used to identify the user. The content card identification unit 242 would use whatever information is provided to identify the user to which the content card information will be displayed.

The method then proceeds to step 504 where the content card identification unit 242 obtains information about characteristics of the user based on the user's identity. This sort of information could be obtained from databases 214 of a customer engagement service 50 or from other sources.

The method then proceeds to step 506 where the content card identification unit 242 determines which data sets should be provided to the software application or web browser that sent the content card data set request. In some instances, this could simply mean identifying all content cards embedded in a company's software application or website, and indicating that data sets should be provided for all of those content cards.

However, as mentioned above the rules/parameters relating to an individual content card may specify conditions under which information is to be presented or is not to be presented via the content card. Those rules/parameters could be time based and/or based on characteristics of the user to whom information is to be presented via the content card. In step 506 the content card identification unit 242 could compare the current time and/or the obtained user characteristics to configuration rules/parameters associated with each of the content cards that are embedded in the software application or website. This allows the content card identification unit 242 to determine which of the content cards that are embedded in the software application or website should actually present information or messages to the identified user. Those content cards are then identified as the ones for which the dynamic data set generation unit 244 should generate data sets.

In some embodiments, once the user's identity or characteristics of the user have been determined the content card identification unit 242 could consult message campaign rules/parameters to determine which messages to deliver to the user via one or more content cards embedded in the company software application or website.

Figure 6:
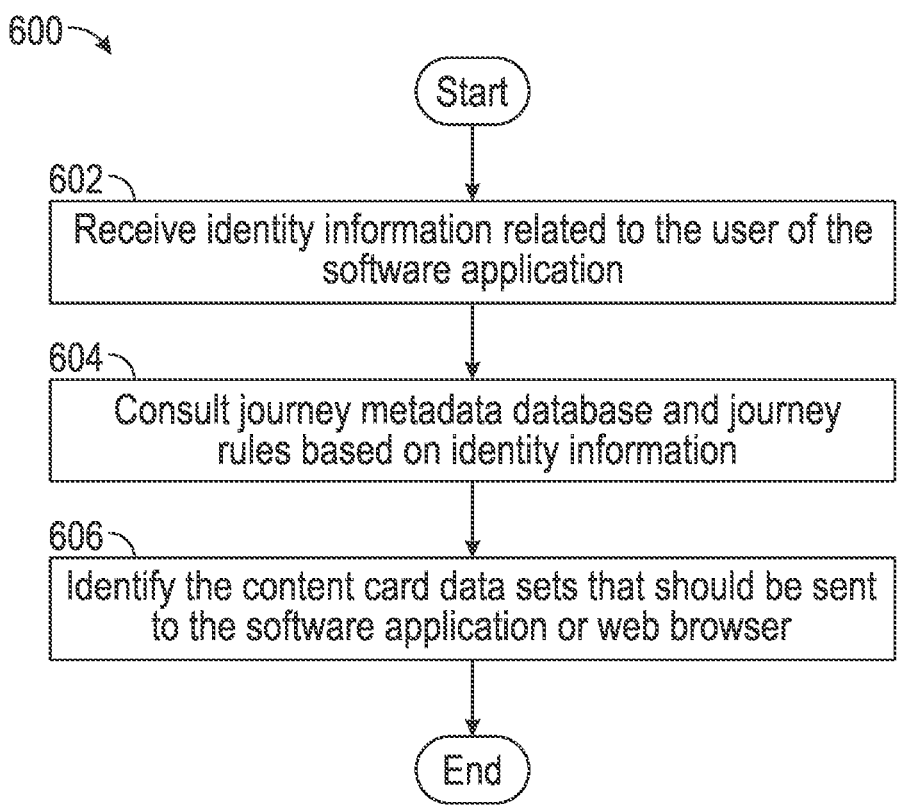
FIG. 6 is a flowchart illustrating steps of another method of identifying the content card data sets that should be generated in response to a request for content card data sets received from a software application being run by a particular user.

FIG. 6 illustrates steps of another method that could be performed by the content card identification unit 242 to identify those content card data sets which must be generated to satisfy a content card data set request received from a particular instantiation of the company's software application or from a web browser displaying the company's website. Here again, this corresponds to step 404 of the method depicted in FIG. 4 and discussed above. In this instance, the content card identification unit will base the determination of which content cards to generate and send based on message journey rules/parameters and journey metadata information.

The method begins and proceeds to step 602 where the dynamic data set providing unit 238 receives, as part of a data set request, information that can be used to identify a user of the instantiation of the company's software application or the web browser displaying the company's website.

The method then proceeds to step 604 where the content card identification unit 242 identifies the user based on the identity information received in step 602. The content card identification unit 242 then obtains journey metadata from a journey metadata database to determine where the user is within one or more journeys. The existence or non-existence of metadata for one of more steps of a journey can itself provide an indication of where the user is within a journey.

The method then proceeds to step 506 where the content card identification unit 242 determines which content card data sets should be provided to the software application or web browser that sent the content card data set request. This would typically involve consulting message journey parameters or rules, based on the user's journey metadata retrieved in step 604 to determine which messages, if any, should be presented to the user in content cards that are embedded in the company software application or website.

Figure 7:
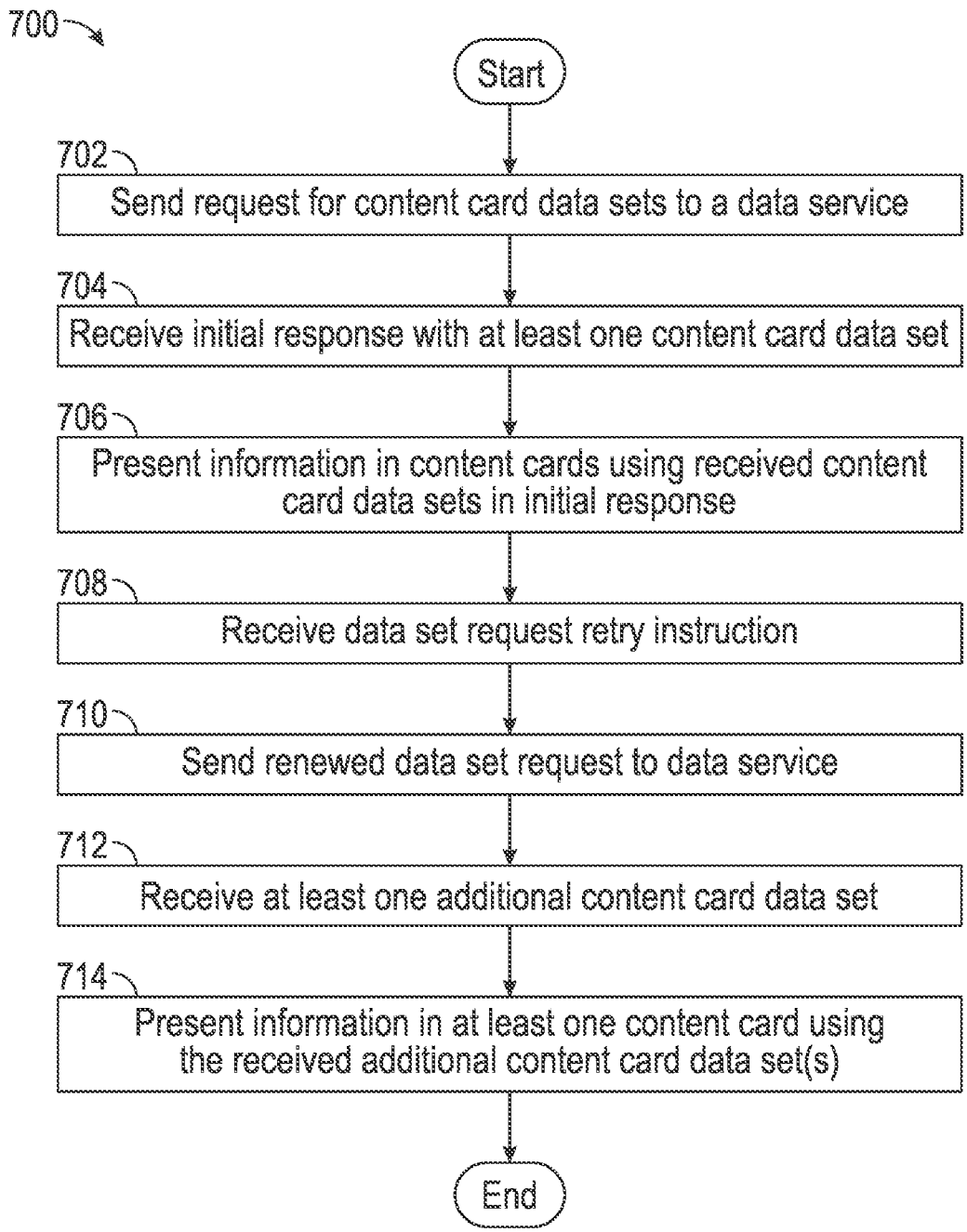
FIG. 7 is a flowchart illustrating steps of a method that would be performed by a software application to obtain and use content card data sets to display information and messages to a user within content cards embedded in the software application.

FIG. 7 illustrates steps of a method that would be performed by company's software application or by a web browser which is displaying a company's website. This assumes that the company's software application or website has at least one embedded content card which can present information or messages to a user based on information in corresponding data sets, as described above.

The method begins and proceeds to step 702 where the software application or web browser sends a request to a data service for content card data sets. Typically step 702 would be performed when the software application first starts up or when a web browser first navigates to a company's website. However, step 702 might be performed at other times. For example, a company's software application may be configured to send out a new request for a data set every 24 hours.

The data set request sent to the data service in step 602 would include information that allows the data service to identify the user of the software application or web browser. As noted above, this identity information could take many different forms.

The data set request sent in step 702 may simply request data sets for content cards without specifying which content cards are embedded in the software application or website. It would then be up to the content card identification unit 242 to determine which data sets to send back to the software application or web browser in response to the request. In other instances, the data request sent in step 702 may include an indication of which content cards are embedded in the software application or website and/or an identification of which data sets are being requested.

After the data service generates a first group of data sets using readily available information, as discussed above in connection with the method illustrated in FIG. 4, the method then proceeds to step 704 where the software application or web browser receives at least one content card data set from the data service. As explained above, the data set(s) may include personalization or customization for the user.

In step 706, the software application or web browser then presents information or messages in one or more embedded content cards using the data set or sets received in step 704.

As explained above, in some instances the data service will be unable to immediately provide data sets for all of the content cards embedded in the software application or website. In that case, the data service will send a data set request retry instruction to the software application or web browser, indicating that the software application or web browser should make a renewed data set request at some time in the future. Step 708 involves receiving that data set request retry instruction. Note, step 708 is an optional step and would only be performed if the data service was unable to immediately provide data sets for all of the content cards embedded in the software application or website.

If the data service sent a data set request retry instruction to the software application, the method would then proceed to step 710 where the software application or web browser sends a renewed request for content card data sets to the data service at the time specified in the request retry instruction.

The method then proceeds to step 712 where the software application or web browser receives at least one additional content card data set which has been prepared and sent by the data service. The method then proceeds to step 714 where the software application or web browser uses information in the additional content card data sets to present messages and information within one or more embedded content cards. The method then ends.

Note, steps 710 and 712 are also optional and would only be performed if the data service was unable to immediately provide data sets for all of the content cards embedded in the software application.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module." Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 8:
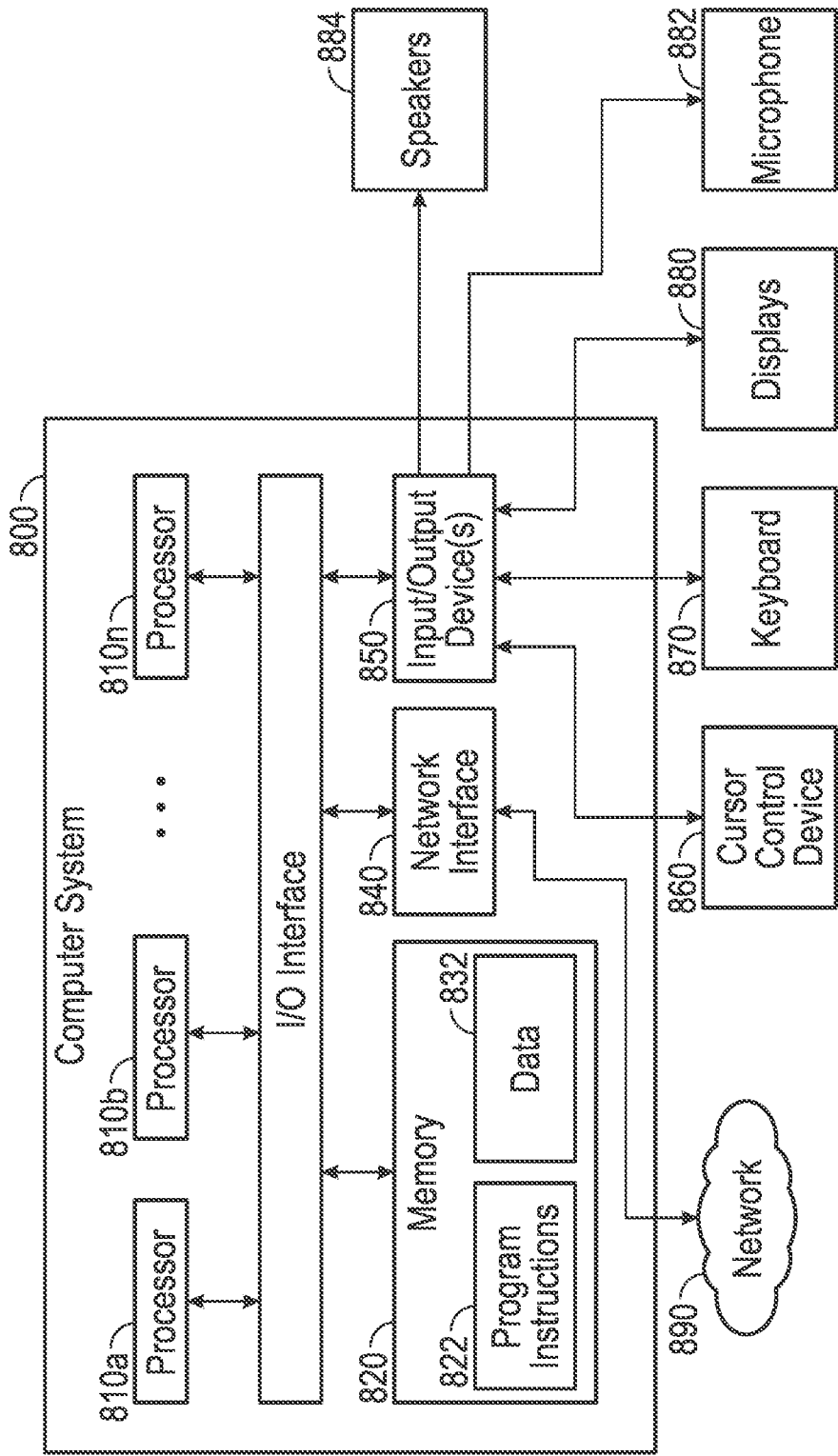
FIG. 8 is a diagram of a computer system and associated peripherals which could embody the invention, or which could be used to practice methods embodying the invention.

FIG. 8 depicts a computer system 800 that can be utilized in various embodiments of the present invention to implement the invention according to one or more embodiments. The various embodiments as described herein may be executed on one or more computer systems, which may interact with various other devices. One such computer system is the computer system 800 illustrated in FIG. 8. The computer system 800 may be configured to implement the methods described above. The computer system 800 may be used to implement any other system, device, element, functionality or method of the above-described embodiments. In the illustrated embodiments, the computer system 800 may be configured to implement the disclosed methods as processor-executable executable program instructions 822 (e.g., program instructions executable by processor(s) 810) in various embodiments.

In the illustrated embodiment, computer system 800 includes one or more processors 810*a*-810*n* coupled to a system memory 820 via an input/output (I/O) interface 830. Computer system 800 further includes a network interface 840 coupled to I/O interface 830, and one or more input/output devices 850, such as cursor control device 860, keyboard 870, display(s) 880, microphone 882 and speakers 884. In various embodiments, any of the components may be utilized by the system to receive user input described above. In various embodiments, a user interface may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, the computer system 800 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs). In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network; for example, via telecommunications/telephony networks such as analog voice networks or digital fiber communications networks, via storage area networks such as Fiber Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the operations and methods described above, such as the methods illustrated by the flowcharts of FIGS. 4-7. In other embodiments, different elements and data may be included.

Those skilled in the art will appreciate that the computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or nonvolatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by a data service for providing content card data sets, comprising:
   receiving, at a server of a data service, a first data set request for one or more content card data sets, each content card data set including information that is used to present information, images, sound recordings and/or videos within content cards embedded within a software application or website, wherein the first data set request is received from a software application running on a user's computing device and wherein the first data set request includes identity information that can be used to identify a user of the software application;
   identifying those content card data sets that should be sent to the software application at the present time based on the user's identity or characteristics of the user, and based on content card parameters;
   generating, in response to receiving the first data set request, one or more content card data sets for at least some of the identified content card data sets using immediately available data; and
   sending an initial response to the software application that includes one or more content card data sets that were generated with the immediately available data.

2. The method of claim 1, further comprising:
   sending a data set request retry instruction to the software application running on the user's computing device if any of the identified content card data sets that should be sent to the software application were not a part of the initial response sent to the software application; and
   generating one or more additional content card data sets for those of the identified content card data sets that should be sent to the software application that were not a part of the initial response sent to the software application.

3. The method of claim 2, further comprising:
   receiving a renewed data set request from the software application after the initial response has been sent to the software application; and
   sending a supplemental response to the software application in response to receipt of the renewed data set request, where the supplemental response includes the one or more additional content card data sets.

4. The method of claim 2, wherein generating one or more additional content card data sets comprises obtaining, from a third-party data source, relevant information that is relevant to the user based on the identity information contained in the first data set request, and wherein the step of generating one or more additional content card data sets is based on the obtained relevant information.

5. The method of claim 2, wherein the data set request retry instruction provides an indication of when the software application running on the user's computing device should send a renewed data set request.

6. The method of claim 1, wherein identifying those content card data sets that should be sent to the software application at the present time comprises:
   determining at least one characteristic of the user based on the identity information contained in the first data set request; and
   identifying those content cards data sets that should be sent be sent to the software application based on the determined at least one characteristic of the user.

7. The method of claim 6, wherein the method further comprises determining a segment to which the user belongs based on the determined at least one characteristic, and wherein identifying those content card data sets that should be sent to the software application is based on segment-based content card parameters and the determined segment to which the user belongs.

8. The method of claim 1, wherein identifying those content card data sets that should be sent to the software application at the present time comprises identifying content card data sets based on the identity information and content card campaign parameters.

9. The method of claim 1, wherein the method further comprises:
   obtaining journey metadata for the user from a journey metadata database based on the identity information; and
   wherein identifying those content card data sets that should be sent to the software application at the present time is based on the obtained journey metadata.

10. The method of claim 1, wherein identifying those content card data sets that should be sent to the software application at the present time comprises identifying content card data sets based on content card campaign timing parameters that relate to when information or messages are to be presented to users via content cards.

11. The method of claim 1, wherein generating one or more content card data sets for at least some of the identified content card data sets using immediately available data comprises:
    determining at least one characteristic of the user based on the identity information contained in the first data set request; and
    generating at least one content card data set that is customized for the user in some fashion based on the determined at least one characteristic.

12. A system for providing content card data sets, comprising:
    means for receiving, at a server of a data service, a first data set request for one or more content card data sets, each content card data set including information that is used to present information, images, sound recordings and/or videos within content cards embedded within a software application or website, wherein the first data set request is received from a software application running on a user's computing device and wherein the first data set request includes identity information that can be used to identify a user of the software application;
    means for identifying those content card data sets that should be sent to the software application at the present time based on the user's identity or characteristics of the user, and based on content card parameters;
    means for generating, in response to receiving the first data set request, one or more content card data sets for at least some of the identified content card data sets using immediately available data; and
    means for sending an initial response to the software application that includes one or more content card data sets that were generated with the immediately available data.

13. A system for providing content card data sets, comprising:
    at least one memory; and
    one or more processors that are configured to perform a method that includes the steps of:

receiving, at a server of a data service, a first data set request for one or more content card data sets, each content card data set including information that is used to present information, images, sound recordings and/or videos within content cards embedded within a software application or website, wherein the first data set request is received from a software application running on a user's computing device and wherein the first data set request includes identity information that can be used to identify a user of the software application;

identifying those content card data sets that should be sent to the software application at the present time based on the user's identity or characteristics of the user, and based on content card parameters;

generating, in response to receiving the first data set request, one or more content card data sets for at least some of the identified content card data sets using immediately available data; and sending an initial response to the software application that includes one or more content card data sets that were generated with the immediately available data.

14. The system of claim 13, wherein the method performed by the one or more processors further comprises:
sending a data set request retry instruction to the software application running on the user's computing device if any of the identified content card data sets that should be sent to the software application were not a part of the initial response sent to the software application; and
generating one or more additional content card data sets for those of the identified content card data sets that should be sent to the software application that were not a part of the initial response sent to the software application.

15. The system of claim 14, wherein the method performed by the one or more processors further comprises:
receiving a renewed data set request from the software application after the initial response has been sent to the software application; and
sending a supplemental response to the software application in response to receipt of the renewed data set request, where the supplemental response includes the one or more additional content card data sets.

16. The system of claim 14, wherein generating one or more additional content card data sets comprises obtaining, from a third-party data source, relevant information that is relevant to the user based on the identity information contained in the first data set request, and wherein the step of generating one or more additional content card data sets is based on the obtained relevant information.

17. The system of claim 14, wherein the data set request retry instruction provides an indication of when the software application running on the user's computing device should send a renewed data set request.

18. The system of claim 13, wherein identifying those content card data sets that should be sent to the software application at the present time comprises:
determining at least one characteristic of the user based on the identity information contained in the first data set request; and
identifying those content cards data sets that should be sent be sent to the software application based on the determined at least one characteristic of the user.

19. The system of claim 18, wherein the method performed by the one or more processors further comprises determining a segment to which the user belongs based on the determined at least one characteristic, and wherein identifying those content card data sets that should be sent to the software application is based on segment-based content card parameters and the determined segment to which the user belongs.

20. The system of claim 13, wherein identifying those content card data sets that should be sent to the software application at the present time comprises identifying content card data sets based on the identity information and content card campaign parameters.

21. The system of claim 13, wherein the method performed by the one or more processors further comprises:
obtaining journey metadata for the user from a journey metadata database based on the identity information; and
wherein identifying those content card data sets that should be sent to the software application at the present time is based on the obtained journey metadata.

22. The system of claim 13, wherein identifying those content card data sets that should be sent to the software application at the present time comprises identifying content card data sets based on content card timing parameters that relate to when information or messages are to be presented to users via content cards.

23. The system of claim 13, wherein generating one or more content card data sets for at least some of the identified content card data sets using immediately available data comprises:
determining at least one characteristic of the user based on the identity information contained in the first data set request; and
generating at least one content card data set that is customized for the user in some fashion based on the determined at least one characteristic.

24. A non-transitory computer-readable medium bearing instructions which, when performed by one or more processors, causes the one or more processors to perform a method for providing content card data sets, the method comprising:
receiving, at a server of a data service, a first data set request for one or more content card data sets, each content card data set including information that is used to present information, images, sound recordings and/or videos within content cards embedded within a software application or website, wherein the first data set request is received from a software application running on a user's computing device and wherein the first data set request includes identity information that can be used to identify a user of the software application;
identifying those content card data sets that should be sent to the software application at the present time based on the user's identity or characteristics of the user, and based on content card parameters;
generating, in response to receiving the first data set request, one or more content card data sets for at least some of the identified content card data sets using immediately available data; and
sending an initial response to the software application that includes one or more content card data sets that were generated with the immediately available data.

* * * * *